(12) United States Patent
Chen et al.

(10) Patent No.: US 11,067,143 B2
(45) Date of Patent: Jul. 20, 2021

(54) ADJUSTMENT STRUCTURE OF HYDRAULIC BRAKE SYSTEM

(71) Applicant: GIANT MANUFACTURING CO., LTD., Taichung (TW)

(72) Inventors: I-Teh Chen, Taichung (TW); Che-Wei Hsu, New Taipei (TW)

(73) Assignee: GIANT MANUFACTURING CO., LTD., Taichung (TW)

( * ) Notice: Subject to any disclaimer, the term of this patent is extended or adjusted under 35 U.S.C. 154(b) by 37 days.

(21) Appl. No.: 16/108,063

(22) Filed: Aug. 21, 2018

(65) Prior Publication Data
US 2019/0063531 A1    Feb. 28, 2019

(30) Foreign Application Priority Data

Aug. 23, 2017   (TW) .................................. 106128634

(51) Int. Cl.
*B62L 3/02*      (2006.01)
*F16D 65/54*   (2006.01)
*B60T 11/236*  (2006.01)

(52) U.S. Cl.
CPC ............ *F16D 65/54* (2013.01); *B60T 11/236* (2013.01); *B62L 3/023* (2013.01)

(58) Field of Classification Search
CPC .... B62L 3/023; B62L 3/00; B62L 3/02; F16D 2125/62; F16D 2125/60; F16D 65/46; B60T 7/108; B60T 11/046; B60T 11/102
See application file for complete search history.

(56) References Cited

U.S. PATENT DOCUMENTS

| | | | | |
|---|---|---|---|---|
| 6,341,673 B1 * | 1/2002 | Kuo | ........................ | B62L 3/00 |
| | | | | 188/24.22 |
| 9,334,012 B1 * | 5/2016 | Ward | ........................ | B62L 3/02 |
| 2011/0185836 A1 * | 8/2011 | Kawakami | ............ | B62M 25/04 |
| | | | | 74/473.13 |
| 2014/0231203 A1 | 8/2014 | Chen | | |
| 2016/0252146 A1 | 9/2016 | Huang | | |

FOREIGN PATENT DOCUMENTS

| | | | | |
|---|---|---|---|---|
| DE | 29601448 U1 * | 4/1996 | ............ | B62K 23/00 |
| FR | 2681116 A1 * | 3/1993 | ............ | B60T 11/103 |
| TW | M522177 U | 5/2016 | | |
| TW | I552905 B | 10/2016 | | |
| TW | I589483 B | 7/2017 | | |

* cited by examiner

*Primary Examiner* — Robert A. Siconolfi
*Assistant Examiner* — Stephen M Bowes
(74) *Attorney, Agent, or Firm* — CKC & Partners Co., LLC

(57) ABSTRACT

An adjustment structure of a hydraulic brake system is provided, which includes a main body, a piston and an adjusting device. The main body includes at least one fluid reservoir, an inner chamber and at least one fluid passage. The inner chamber includes a cylinder channel and an opening part, and the cylinder channel is communicated with the fluid reservoir by at least one fluid port. The piston is driven by the brake cable to be limitedly moved in the cylinder channel. The piston includes a cable hole for receiving the brake cable, and the piston has a normal operated position relative to the fluid port. The adjusting device is disposed in the opening part and is abutted against the piston. The adjusting device is operated to be moved relative to the brake cable such that the piston is adjusted to be returned to the normal operated position.

5 Claims, 19 Drawing Sheets

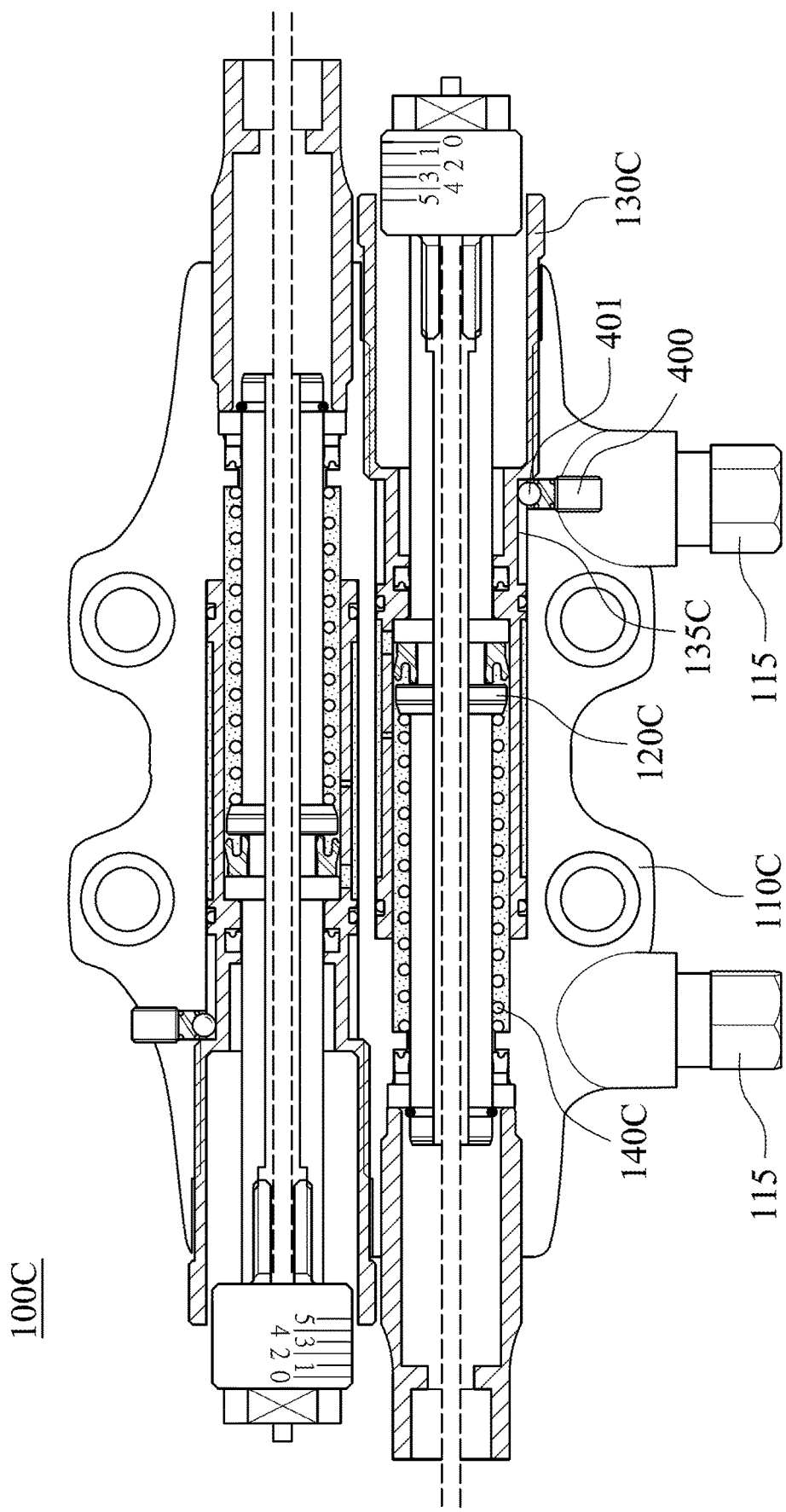

ADJUSTMENT STRUCTURE OF HYDRAULIC BRAKE SYSTEM

RELATED APPLICATIONS

This application claims priority to Taiwan Application Serial Number 106128634, filed Aug. 23, 2017, which is herein incorporated by reference.

BACKGROUND

Technical Field

The present disclosure relates to an adjustment structure of a hydraulic brake system. More particularly, the present disclosure relates to an adjustment structure of a hydraulic brake system which can solve the position shift problem of the piston and the seal to satisfy the accurate requirement.

Description of Related Art

Since there are many kinds of hydraulic brake system used in bicycle recently, the hydraulic brake system gradually becomes the most commonly used brake system. The hydraulic brake system includes a brake cable controlled by a brake lever to drive a brake master cylinder, and a fluid hose connected between the brake master cylinder and calipers which are disposed at a wheel. When a rider presses the brake lever, a piston disposed within the brake master cylinder will be moved to push the fluid within the brake master cylinder to go into the fluid hose to push the calipers such that the brake pads of the calipers are pushed forward to press against the brake disc; thus, the wheel can be braked or stopped.

However, the length of the brake cable will be adjusted before used in the brake system. When a user adjusts the brake lever, the brake cable will be moved corresponding to the adjustment thereof. Accordingly, the piston and a seal connected to the brake cable will be moved and the position thereof will be changed simultaneously. Therefore, the position of the piston and the seal is improper; as a result, the fluid port of the hydraulic master cylinder will be blocked, or the piston and the seal exceed the fluid port, i.e., at a wrong position, such that a close loop is formed. When the fluid ports of the hydraulic master cylinder are blocked, the brake system cannot be operated normally, or some problems, e.g., mistaken operation when the brake lever being not operated, will be occurred.

Another problem existing in the conventional hydraulic brake system is that the piston will move forward automatically to adjust the gap between the brake pads and the disc after the brake pads are worn. The fluid will go into the cylinder to compensate the pressure within the cylinder when the piston goes back to the original position. If the piston moves forward to adjust the gap between the brake pads and the disc after the brake pads are worn, the seal may block the fluid ports; hence, the fluid cannot go into the cylinder through the fluid ports and the fluid therewithin is insufficient such that the brake may fail to work. In addition, if the fluid within the cylinder is expanded due to thermal effect after long time operation, the piston will return to a wrong position and the fluid cannot go out through the fluid port. Moreover, the expanded fluid will push the piston such that the brake pads will be pushed out to touch the brake disc. As a result, the hydraulic brake system may be locked up or has mistaken operations.

Hence, it is clear that there is a need to develop an adjustment structure of a hydraulic brake system which can adjust the relative position between the fluid ports and the piston such that the piston can be operated at a normal position.

SUMMARY

The present disclosure provides an adjustment structure of a hydraulic brake system, which is coordinated with a brake cable controlled by a brake lever and includes a main body, a piston and an adjusting device. The main body includes at least one fluid reservoir, an inner chamber and at least one fluid passage. The inner chamber includes a cylinder channel and an opening part communicated with the cylinder channel, and the cylinder channel is communicated with the fluid reservoir by at least one fluid port of the fluid passage. The piston is driven by the brake cable to be limitedly moved in the cylinder channel. The piston includes a cable hole for receiving the brake cable, and the piston has a normal operated position relative to the at least one fluid port. The adjusting device is disposed in the opening part and is abutted against the piston. The adjusting device is operated to be moved relative to the brake cable such that the piston is adjusted to be returned to the normal operated position.

The present disclosure provides another adjustment structure of a hydraulic brake system, which is coordinated with a brake cable controlled by a brake lever and includes a main body, an adjusting device, a sleeve tube and a piston. The main body includes a fluid reservoir, an inner chamber and at least one fluid port. The inner chamber includes a cylinder channel and an opening part communicated with the cylinder channel. The adjusting device is disposed in the inner chamber, and a first end of the adjusting device is rotatably located in the cylinder channel. The adjusting device includes an annular fluid guiding passage and an inner thread. The annular fluid guiding passage is disposed at the first end and is corresponding to the at least one fluid port. The sleeve tube is positioned in the main body, and is disposed in the first end of the adjusting device. The sleeve tube includes an outer thread coupled to the inner thread of the adjusting device, and the adjusting device is moved reciprocatively relative to the sleeve tube when rotating. The sleeve tube includes a plurality of supplying ports arranged along an axis of the sleeve tube, and the fluid reservoir is communicated with at least one of the supplying ports through the at least one fluid port and the annular fluid guiding passage. The piston is driven by the brake cable to be moved within the sleeve tube. The piston includes a cable hole for receiving the brake cable, and the adjusting device is rotated to adjust the piston to be located at a normal operated position relative to at least one of the supplying ports.

The present disclosure provides yet another adjustment structure of a hydraulic brake system, which is coordinated with a brake cable controlled by a brake lever and includes a main body, an adjusting device, a sleeve tube and a piston. The main body includes a fluid reservoir, an inner chamber and at least one fluid port. The inner chamber includes a cylinder channel and an opening part communicated with the cylinder channel. The adjusting device is disposed in the inner chamber. A first end of the adjusting device is rotatably located in the cylinder channel. An annular fluid guiding passage is disposed at the first end and is corresponding to the at least one fluid port. The sleeve tube is positioned in the main body, and is disposed in the first end of the adjusting device. The adjusting device is rotatably sleeved on an outside of the sleeve tube. The sleeve tube includes a plurality of supplying ports arranged along a spiral path, and the fluid reservoir is communicated with at least one of the supplying ports through the at least one fluid port and the annular fluid guiding passage. The piston is movably disposed in the sleeve tube and is driven by the brake cable. The piston includes a cable hole for receiving the brake cable, and the adjusting device is rotated to adjust the piston to be located at a normal operated position relative to at least one of the supplying ports.

The present disclosure provides still yet another adjustment structure of a hydraulic brake system, which is coordinated with a brake cable controlled by a brake lever and includes a main body, an adjusting device, a sleeve tube and a piston. The main body includes a fluid reservoir, an inner chamber and at least one fluid port. The inner chamber includes a cylinder channel and an opening part communicated with the cylinder channel. The adjusting device is screwed in the opening part of the main body. The adjusting device is rotated so as to move reciprocatedly in the cylinder channel, and the adjusting device includes an annular fluid guiding passage. The annular fluid guiding passage includes a guiding port and an annular groove connected to the guiding port. The annular groove surrounds an outside of the adjusting device and is communicated with the cylinder channel and the fluid reservoir via the at least one fluid port. The piston is connected to the brake cable and is liquid-tightly disposed in the adjusting device. The piston is limitedly moved in the cylinder channel and includes a cable hole for receiving the brake cable, and the adjusting device is rotated to adjust the piston to be located at a normal operated position relative to the guiding port.

BRIEF DESCRIPTION OF THE DRAWINGS

The present disclosure can be more fully understood by reading the following detailed description of the embodiment, with reference made to the accompanying drawings as follows:

FIG. 2A-1 shows one side view of the adjustment structure of the hydraulic brake system of FIG. 1 after a length of the brake cable is changed by adjusting the brake lever;

FIG. 2A-2 shows a cross-sectional view of the adjustment structure of the hydraulic brake system of FIG. 1 after the length of the brake cable is changed;

FIG. 6B-1 shows one cross-sectional view of the adjustment structure of the hydraulic brake system of FIG. 5A after an adjusting device being operated;

FIG. 6B-2 shows another cross-sectional view of the adjustment structure of the hydraulic brake system of FIG. 5A after the adjusting device being operated;

FIG. 6C-1 shows a partial cross-sectional view of the adjustment structure of the hydraulic brake system of FIG. 6B-1 taken along line 6c-1-6c-1;

FIG. 6C-2 shows a partial cross-sectional view of the adjustment structure of the hydraulic brake system of FIG. 6B-2 taken along line 6c-2-6c-2;

FIG. 7 shows a cross-sectional view of an adjustment structure of a hydraulic brake system according to a fourth embodiment of the present disclosure;

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

Figure 1:
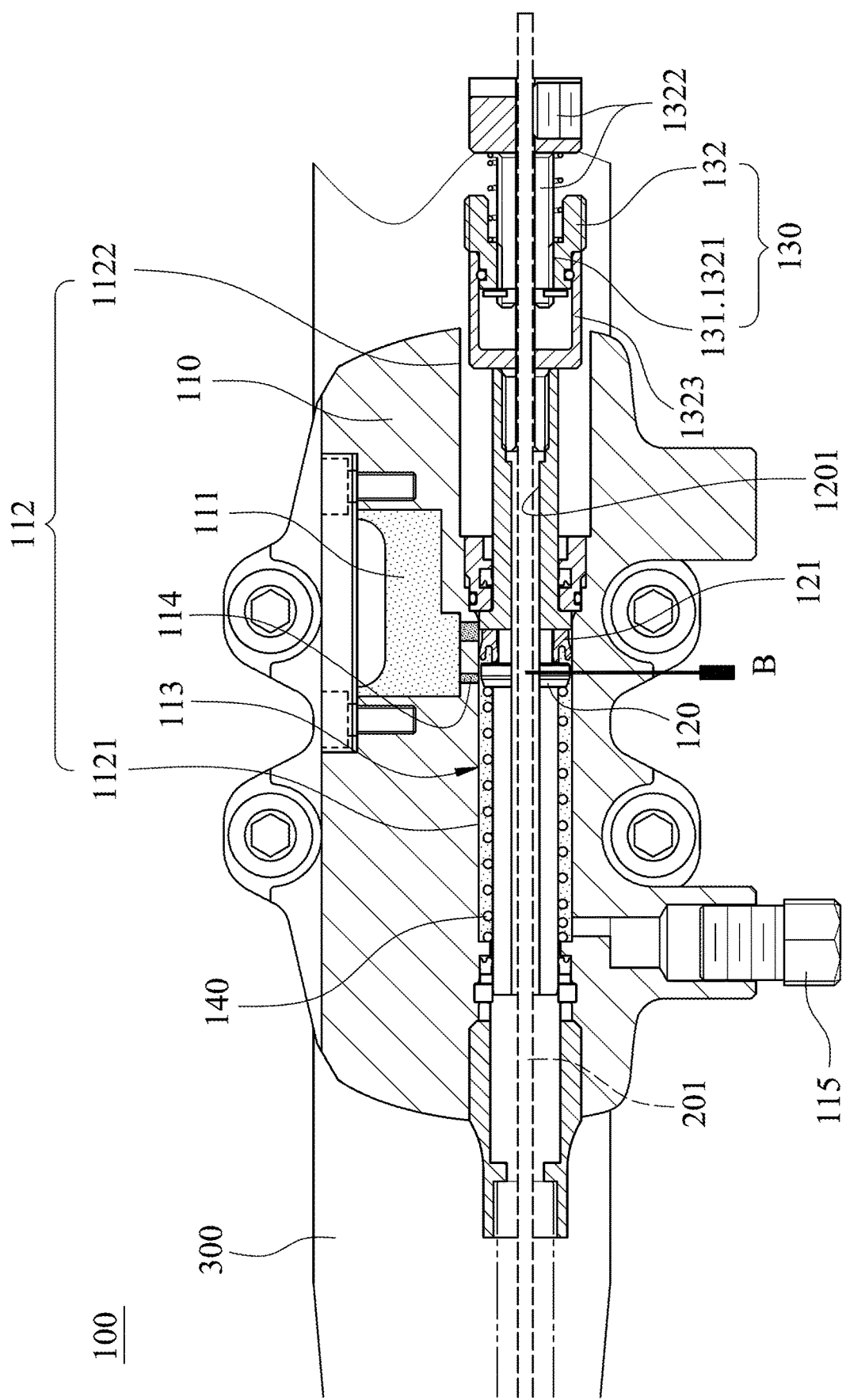
FIG. 1 shows a cross-sectional view of an adjustment structure of a hydraulic brake system according to a first embodiment of the present disclosure.
Figures 1, 2A:
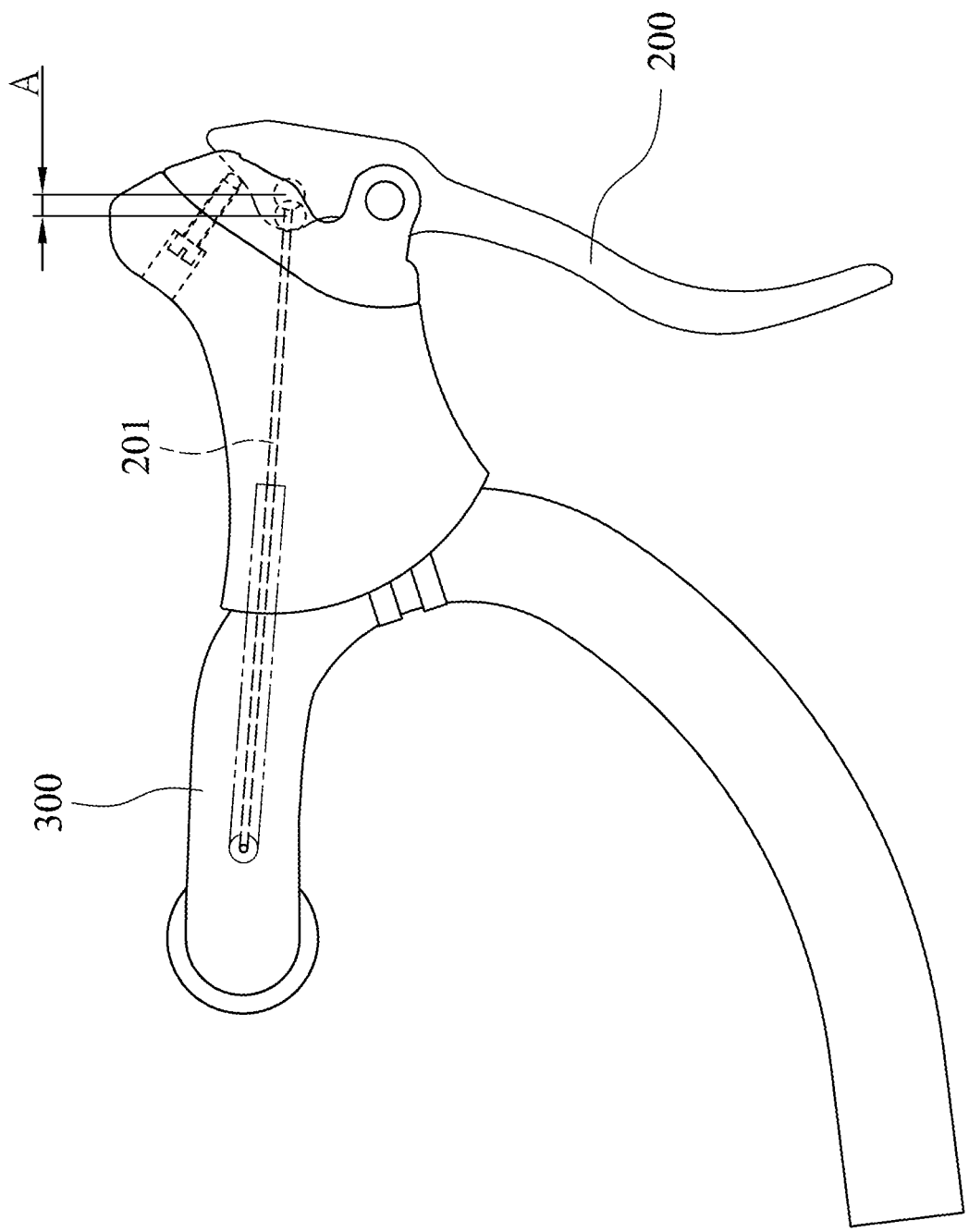
Figures 2, 2A:
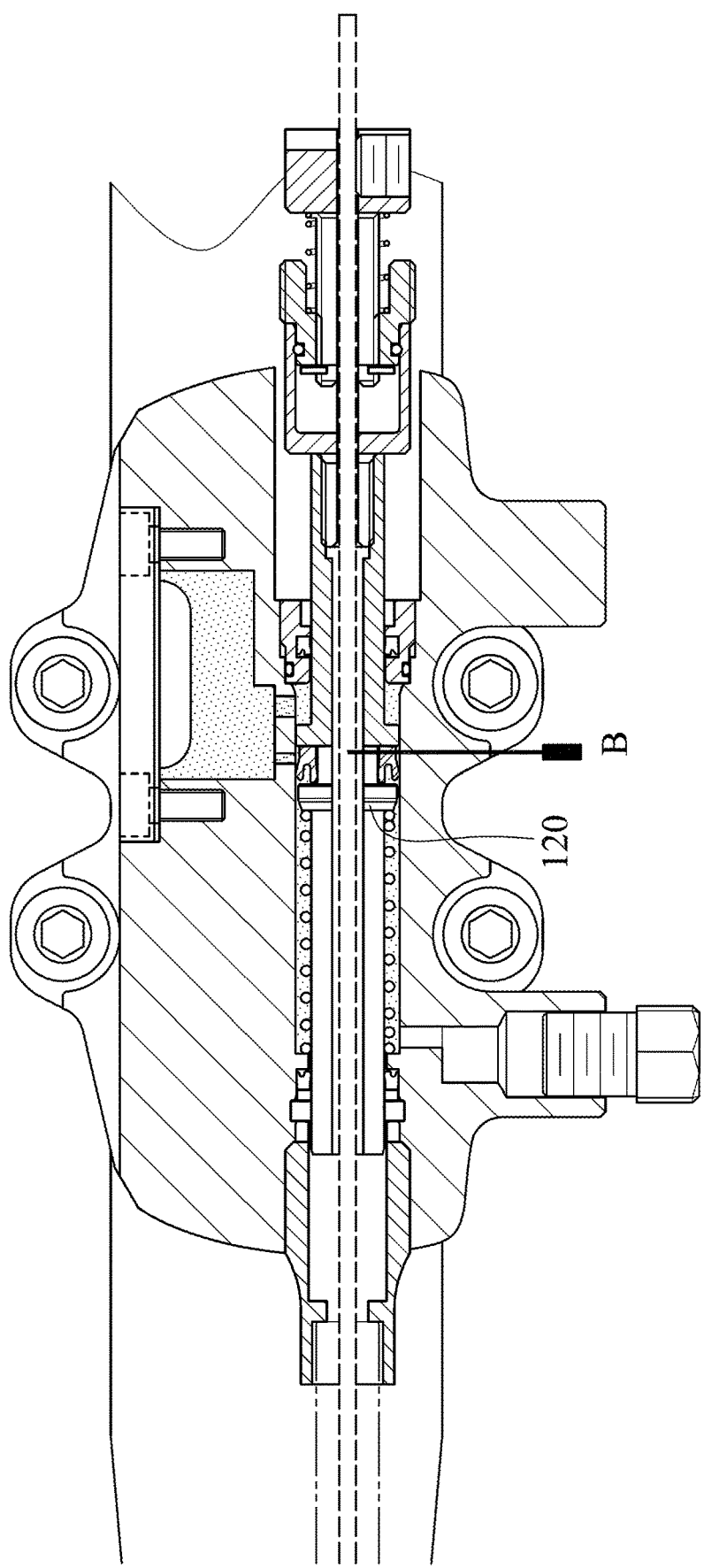
Figure 2B:
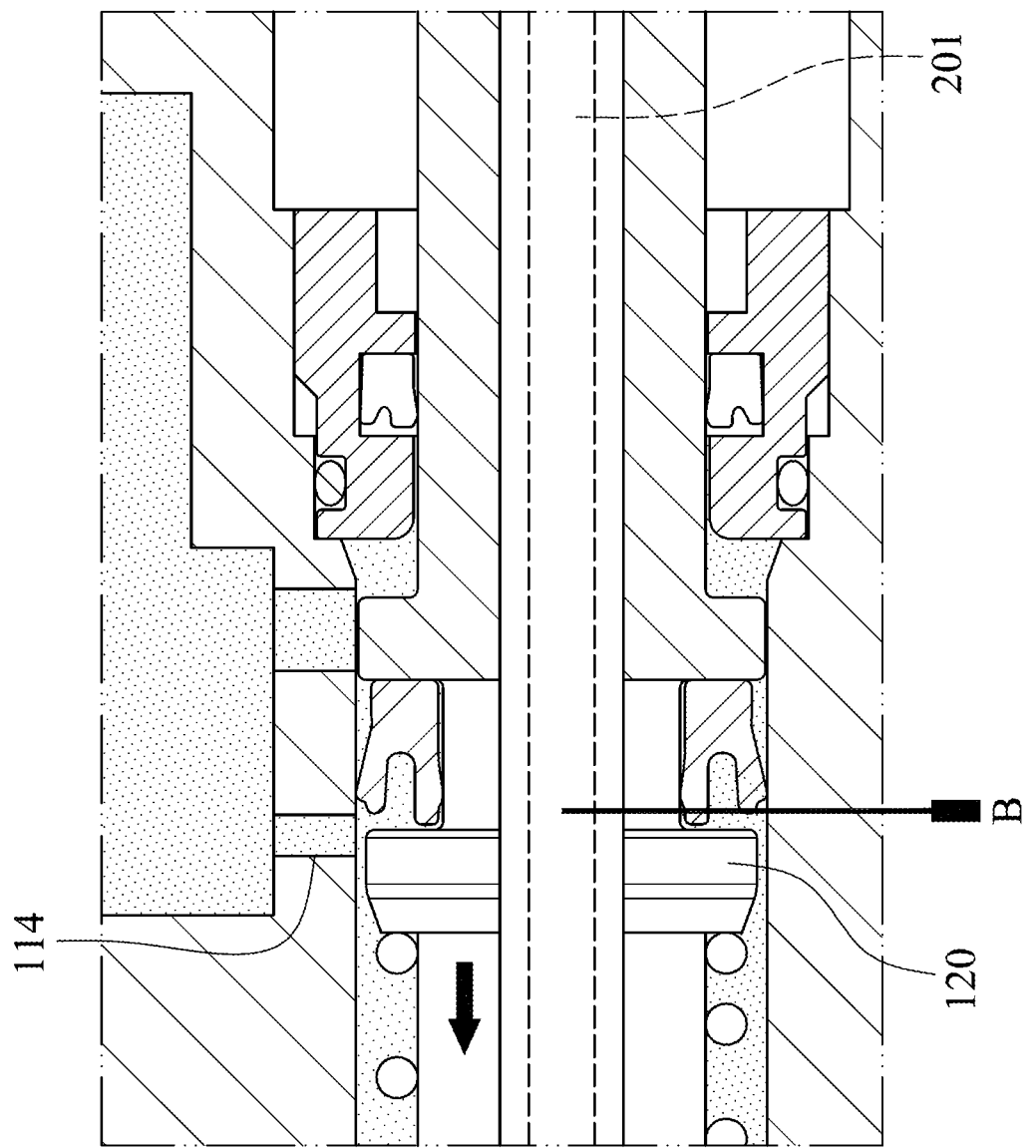
FIG. 2B shows a cross-sectional view of the adjustment structure of the hydraulic brake system of FIG. 1 before an adjusting device being operated.
Figure 2C:
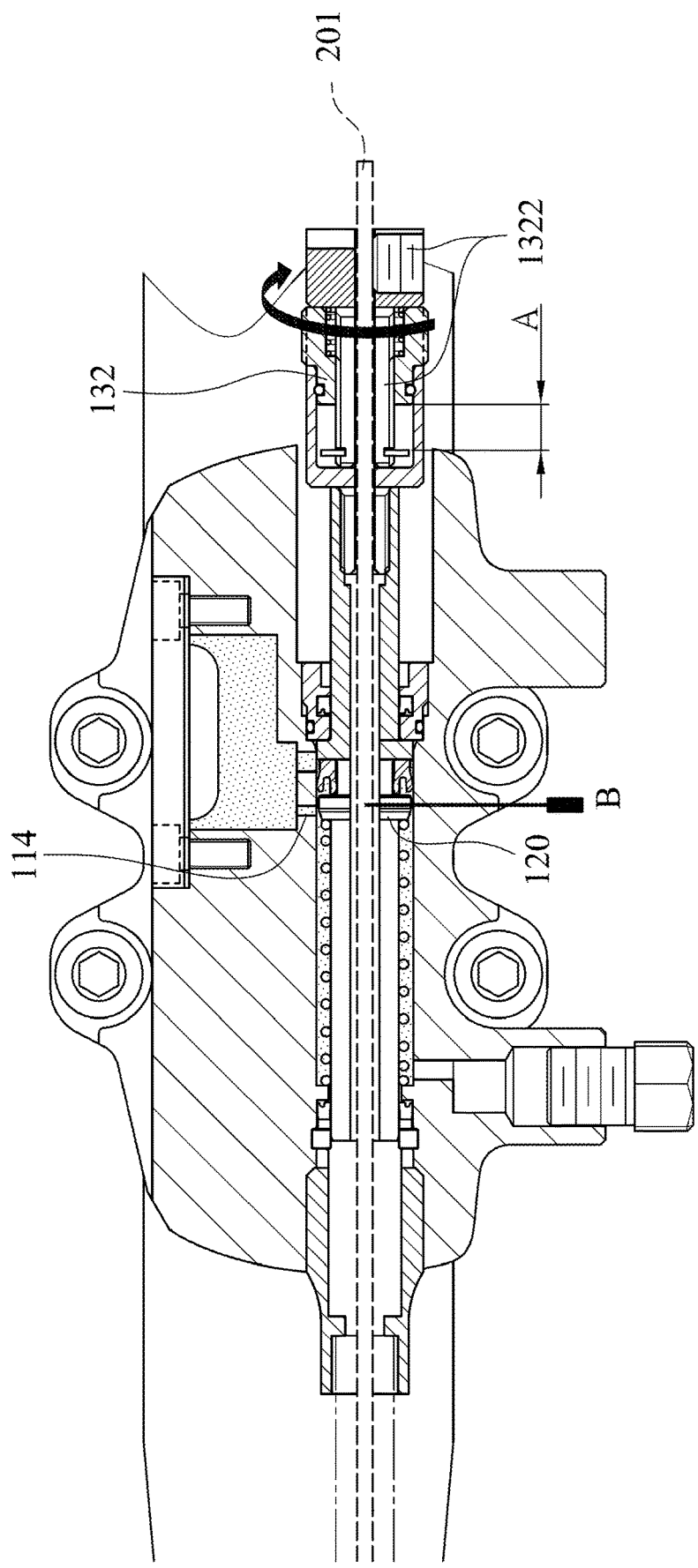
FIG. 2C shows a cross-sectional view of the adjustment structure of the hydraulic brake system of FIG. 1 after the adjusting device being operated.

Please refer to FIGS. 1, 2A-1, 2A-2, 2B and 2C. FIG. 1 shows a cross-sectional view of an adjustment structure 100 of a hydraulic brake system according to a first embodiment of the present disclosure. FIG. 2A-1 shows one side view of the adjustment structure 100 of the hydraulic brake system of FIG. 1 after a length of the brake cable 201 is changed by adjusting the brake lever 200. FIG. 2A-2 shows a cross-sectional view of the adjustment structure 100 of the hydraulic brake system of FIG. 1 after the length of the brake cable 201 is changed. FIG. 2B shows a cross-sectional view of the adjustment structure 100 of the hydraulic brake system of FIG. 2A before an adjusting device 130 being operated. FIG. 2C shows a cross-sectional view of the adjustment structure 100 of the hydraulic brake system of FIG. 1 after the adjusting device 130 being operated. Conventional elements of the hydraulic brake system are known by persons skilled in the art, and will not be described.

As shown in FIGS. 1, 2A-1, 2A-2, 2B and 2C, the adjustment structure 100 of the hydraulic brake system is coordinated with a brake cable 201 controlled by a brake lever 200. The adjustment structure 100 of the hydraulic brake system is detachably assembled on a handlebar 300. The adjustment structure 100 of the hydraulic brake system includes a main body 110, a piston 120, an adjusting device 130 and a returning spring 140.

The main body 110 includes a fluid reservoir 111, an inner chamber 112 and at least one fluid passage 113. The inner chamber 112 includes a cylinder channel 1121 and an opening part 1122 communicated with the cylinder channel 1121, and the opening part 1122 where the adjusting device 130 can be set is located at one of two ends of the main body 110. The cylinder channel 1121 is communicated with the fluid reservoir 111 through a fluid port 114 of the fluid passage 113 such that the fluid passage 113 is filled with a hydraulic fluid. The hydraulic fluid can flow out of the cylinder channel 1121 via a hydraulic hose 115.

The piston 120 includes a seal 121, the piston 120 is limitedly moved in the cylinder channel 1121. The piston 120 includes a cable hole 1201 for receiving the brake cable 201, and the piston 120 has a normal operated position B relative to the fluid port 114. When the piston 120 is located at the normal operated position B, the hydraulic brake system can be operated normally, and the piston 120 will not exceed or block the fluid port 114.

The adjusting device 130 is disposed at the opening part 1122 of the main body 110, and the adjusting device 130 is abutted against the piston 120. The adjusting device 130 is operated to move relative to the brake cable 201 such that the piston 120 will return to the normal operated position B. The adjusting device 130 includes a rotatable portion 132 and a cable securing element 1322. The cable securing element 1322 is screwed in the rotatable portion 132 of the adjusting device 130. The cable securing element 1322 is linked up with the brake cable 201, and a tube body 1323 of the adjusting device 130 is moved relative to the cable securing element 1322 by rotation of the rotatable portion 132. Precisely, the rotatable portion 132 is rotatably disposed at the tube body 1323 of the adjusting device 130 and includes an inner thread 131 at an inner wall thereof. The cable securing element 1322 includes an outer thread 1321 coupled to the inner thread 131. The cable securing element 1322 includes a one-piece made component, as well as, exposed from the opening part 1122 for securing the brake cable 201 therewithin. When the rotatable portion 132 is rotated, the tube body 1323 of the adjusting device 130 linked up with the rotatable portion 132 is moved along an axis of the adjusting device 130 relative to the cable securing element 1322 such that the piston 120 can return to the normal operated position B. Hence, through the adjustment of the adjusting device 130, the piston 120 can go back to the normal operated position B in the cylinder channel 1121. In addition, a maximum adjusting length of the adjusting device 130 is corresponding to a maximum adjustable distance A of the brake cable 201.

The returning spring 140 is located between the inner chamber 112 of the main body 110 and the piston 120, and the returning spring 140 pushes the piston 120 to be abutted against the adjusting device 130.

A user can simply rotate the rotatable portion 132 to operate the adjustment structure 100 of the hydraulic brake system. When the brake cable 201 controlled by the brake lever 200 is adjusted with the maximum adjustable distance A, the piston 120 linked up with the brake cable 201 will leave the normal operated position B and move toward the brake lever 200 as shown in FIGS. 2A-1, 2A-2 and 2B, and the piston 120 may exceed or block the fluid port 114. In such a situation, the brake may be locked and unable to work. The user can rotate the rotatable portion 132 manually to adjust the tube body 1323 of the adjusting device 130 to move relative to the brake cable 201 such that the piston 120 will return to the normal operated position B. Consequently, the hydraulic brake system can be operated normally, and the piston 120 will not exceed or block the fluid port 114.

Based on the above description, the adjusting device 130 can be operated manually to adjust the piston 120 to return to the normal operated position B. Hence, the adjustment structure 100 of the hydraulic brake system can be operated to compensate the change of the length of the brake cable 201, and the piston 120 can be located at the normal operated position B to prevent the situation that the piston 120 and the seal 121 exceed or block the fluid port 114. In addition, when the adjusting device 130 is disposed in the opening part 1122 and abutted against the piston 120, the volume of the adjustment structure 100 can become more compacted and the structure can be simplified.

Figure 3:
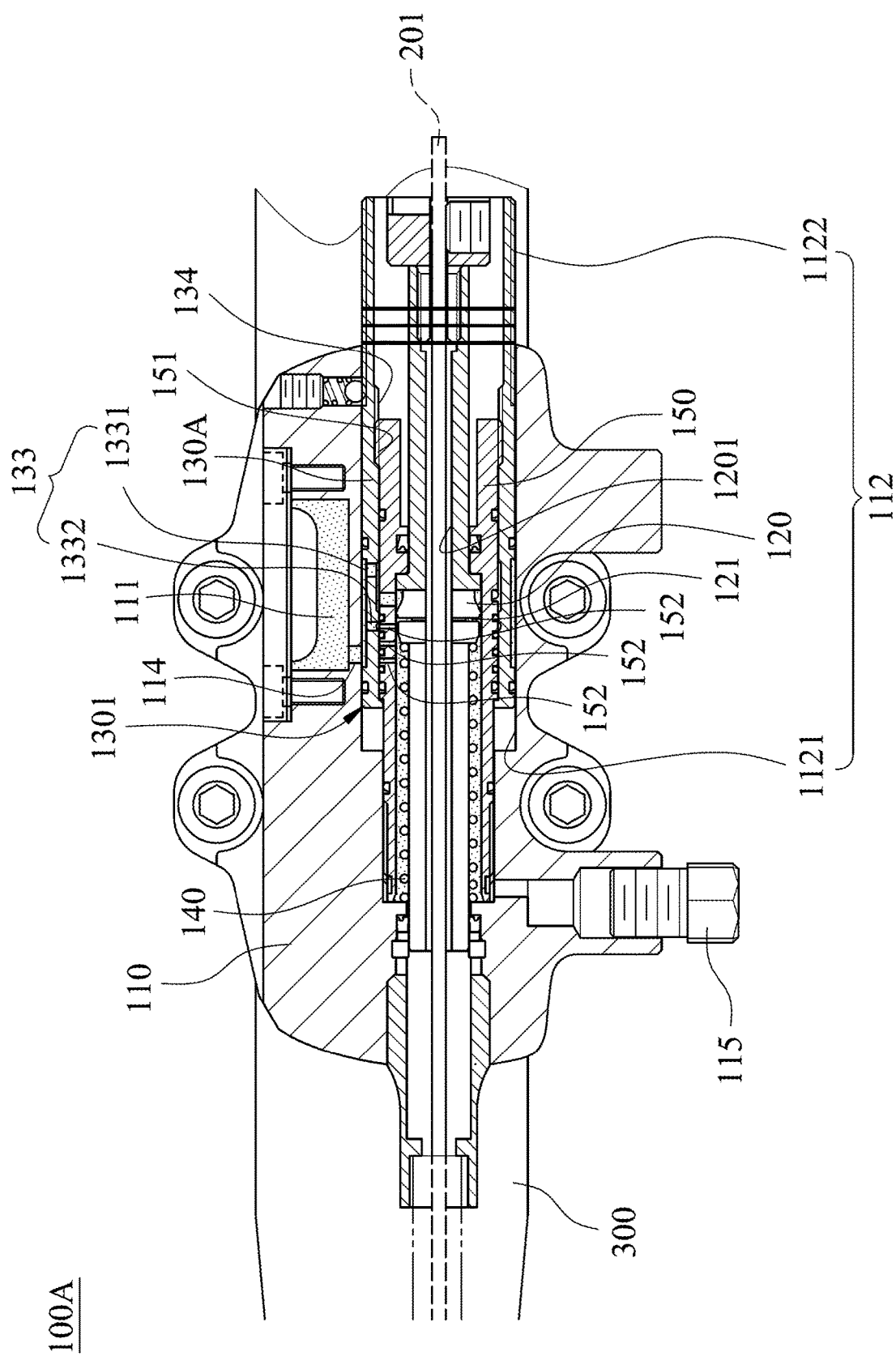
FIG. 3 shows a cross-sectional view of an adjustment structure of a hydraulic brake system according to a second embodiment of the present disclosure.
Figure 4A:
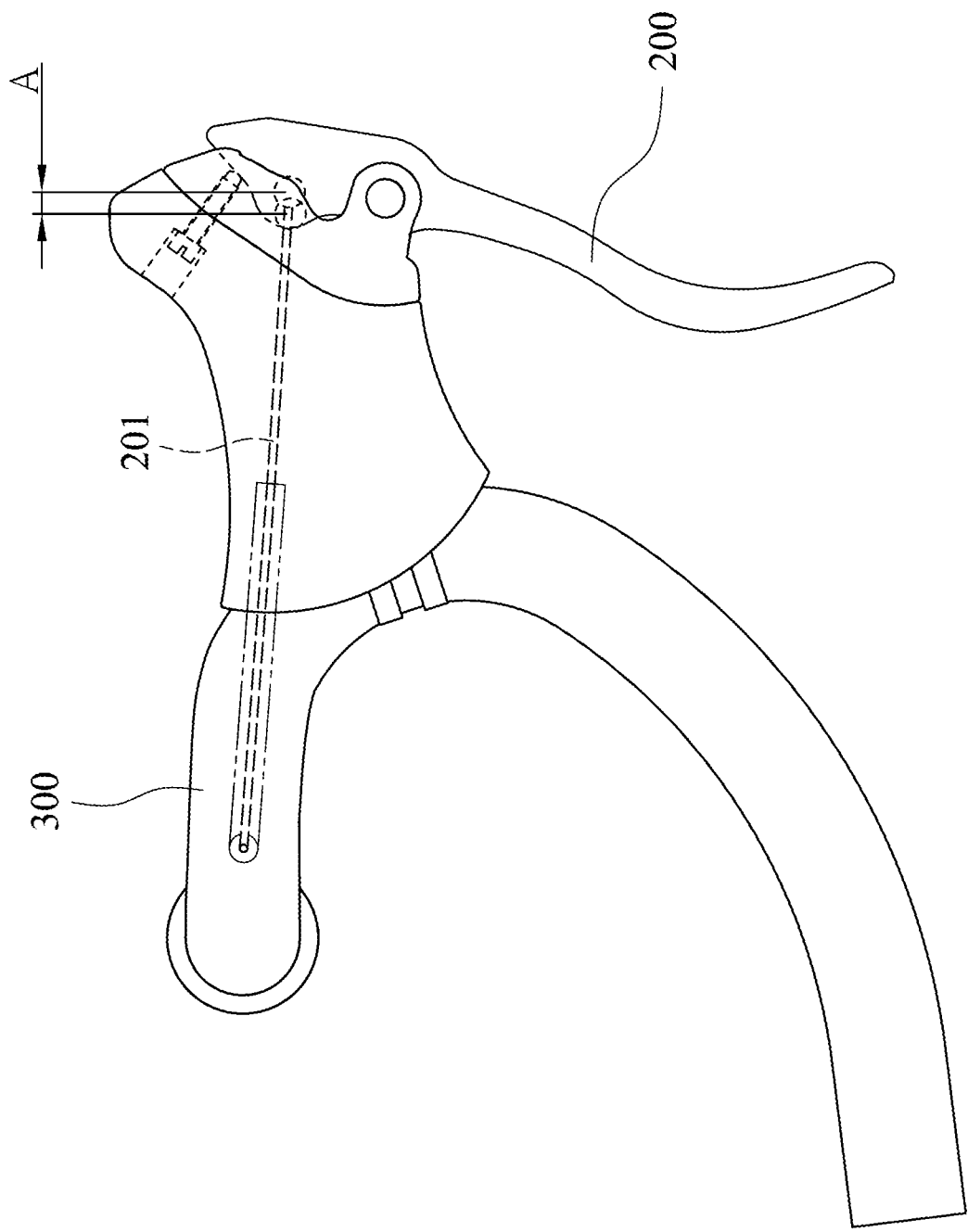
FIG. 4A shows one side view of the adjustment structure of the hydraulic brake system of FIG. 3 after a length of the brake cable is changed by adjusting the brake lever.
Figure 4B:
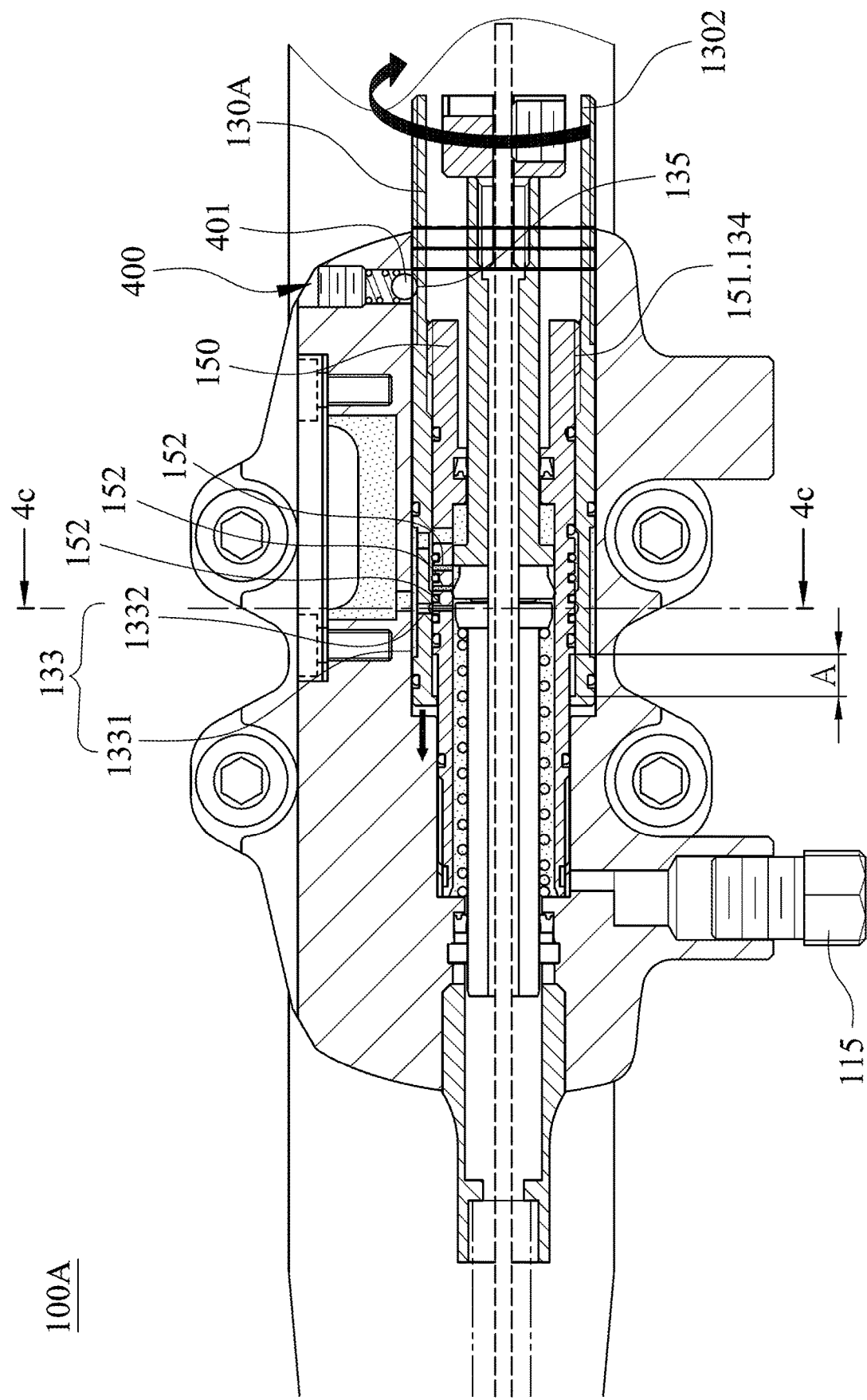
FIG. 4B shows a cross-sectional view of the adjustment structure of the hydraulic brake system of FIG. 3 after an adjusting device being operated.
Figure 4C:
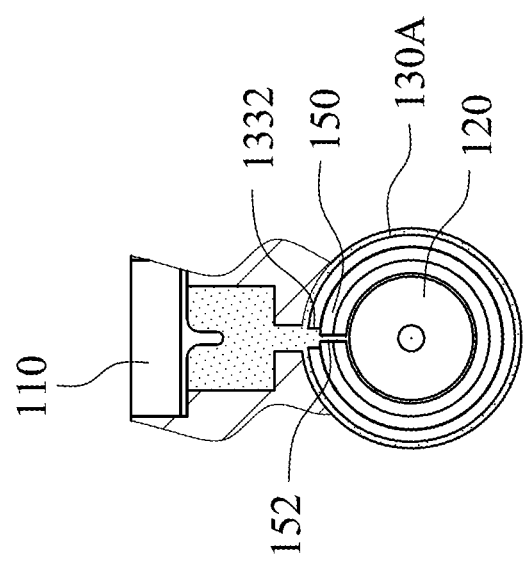
FIG. 4C shows a partial cross-sectional view of the adjustment structure of the hydraulic brake system of FIG. 4B taken along line 4c-4c.

Please refer to FIGS. 3, 4A, 4B and 4C. FIG. 3 shows a cross-sectional view of an adjustment structure 100A of a hydraulic brake system according to a second embodiment of the present disclosure. FIG. 4A shows one side view of the adjustment structure 100A of the hydraulic brake system of FIG. 3 after a length of the brake cable 201 is changed by adjusting the brake lever 200. FIG. 4B shows a cross-sectional view of the adjustment structure 100A of the hydraulic brake system of FIG. 3 after an adjusting device 130A being operated. FIG. 4C shows a partial cross-sectional view of the adjustment structure 100A of the hydraulic brake system of FIG. 4B taken along line 4c-4c.

As shown in FIGS. 3, 4A, 4B and 4C, the adjustment structure 100A of the hydraulic brake system is coordinated with a brake cable 201 controlled by a brake lever 200. The adjustment structure 100A of the hydraulic brake system is detachably assembled on a handlebar 300. The adjustment structure 100A of the hydraulic brake system includes a main body 110, a piston 120, an adjusting device 130A, a returning spring 140 and a sleeve tube 150.

The main body 110 includes a fluid reservoir 111, an inner chamber 112 and at least one fluid passage (not labeled). The inner chamber 112 includes a cylinder channel 1121 and an opening part 1122 communicated with the cylinder channel 1121, and the fluid passage is filled with a hydraulic fluid. The cylinder channel 1121 is communicated with the fluid reservoir 111 through a fluid port 114 of the fluid passage, and the hydraulic fluid can flow out of the cylinder channel 1121 via a hydraulic hose 115.

The adjusting device 130A includes a tube body. The adjusting device 130A is disposed in the inner chamber 112, and a first end 1301 of the adjusting device 130A is rotatably located in the cylinder channel 1121. The adjusting device 130A includes an annular fluid guiding passage 133 located at the first end 1301 of the adjusting device 130A and is corresponding to the fluid port 114. A second end 1302 of the adjusting device 130A is exposed from the opening part 1122 for manually operating. The adjusting device 130A includes an inner thread 134. The annular fluid guiding passage 133 of the adjusting device 130A includes an annular groove 1331 and a guiding port 1332. The annular groove 1331 rotatably surrounds an outside of the adjusting device 130A and is communicated with the fluid port 114. The guiding port 1332 is communicated with the annular groove 1331 and a plurality of supplying ports 152 which will be described in the following paragraphs.

The returning spring 140 is abutted between the inner chamber 112 and the piston 120.

The sleeve tube 150 is securely positioned in the main body 110, and is disposed in the first end 1301 of the adjusting device 130A. The sleeve tube 150 includes an outer thread 151 coupled to the inner thread 134 of the adjusting device 130A, and the adjusting device 130A is moved relative to the sleeve tube 150 reciprocatedly when rotating. The sleeve tube 150 includes the supplying ports 152 arranged along the axis of the sleeve tube 150. An inner space of the sleeve tube 150 is communicated with the fluid reservoir 111 through at least one of the supplying ports 152, the annular fluid guiding passage 133 and the fluid port 114.

The piston 120 includes a seal 121. The piston 120 is located within the sleeve tube 150 which is located in the cylinder channel 1121. The piston 120 includes a cable hole 1201 for receiving the brake cable 201. The piston 120 having a plurality of operated positions relative to the supplying ports 152. When the piston 120 is located at any one of the normal operated positions, the hydraulic brake system can be operated normally, and the piston 120 will not exceed or block all the supplying ports 152.

A user can simply rotate the second end 1302 of the adjusting device 130A to operate the adjustment structure 100A of the hydraulic brake system. When the brake cable 201 controlled by the brake lever 200 is adjusted with the maximum adjustable distance A, the piston 120 linked up with the brake cable 201 will leave the original operated position to move toward the brake lever 200, as shown in FIGS. 4B and 4C, and the piston 120 may exceed or block the outermost supplying port 152 which is communicated with the fluid port 114 through the annular fluid guiding passage 133. In such a situation, the brake may be locked and unable to work. The user can rotate the adjusting device 130A manually such that the adjusting device 130A can be moved relative to the sleeve tube 150 to allow the innermost supplying port 152 to communicate with the fluid reservoir 111 through the annular fluid guiding passage 133 and the fluid port 114, and the piston 120 is located at the normal operated position relative to the innermost supplying port 152. Hence, even if the piston 120 is moved owing to the brake cable 201 adjusted with the maximum adjustable distance A, through the movement of the adjusting device 130A, at least one supplying port 152 will be communicated with the fluid reservoir 111 such that the piston 120 will be located at one of the normal operated positions relative to the supplying port 152 and will not exceed or block all the supplying ports 152; thus, the hydraulic brake system can work normally. Through the description, it is known that the piston 120 can be located at one of the normal operated position by simply and manually operating the adjusting device 130A. Hence, the adjustment structure 100A of the hydraulic brake system can prevent the situation that the piston 120 and the seal 121 exceed or block the supplying ports 152. In addition, because the second end 1302 is exposed from the opening part 1122, and the tube body of the adjusting device 130A is sleeved on an outside of the sleeve tube 150 without abutting the piston 120, the tube body of the adjusting device 130A is sleeved on an outside of the piston 120 such that the volume can become more compacted and the structure can be simplified.

Furthermore, the adjustment structure 100A of the hydraulic brake system can further include a positioning device 400. The positioning device 400 is disposed at the main body 110, and the positioning device 400 includes an abutted ball 401 abutted against the adjusting device 130A. The adjusting device 130A includes a plurality of positioning grooves 135 coordinated with the abutted ball 401. When rotating the adjusting device 130A, the abutted ball 401 will be located at different positioning grooves 135 according to the movement of the adjusting device 130A to achieve the effect of segmental positioning. A visible mark (not labeled) can be located at an outer surface of the second end 1302 of the adjusting device 130A, which is exposed from the opening part 1122. The visible mark shows an adjusting length or a rotatable angle of the adjusting device 130A.

Figure 5A:
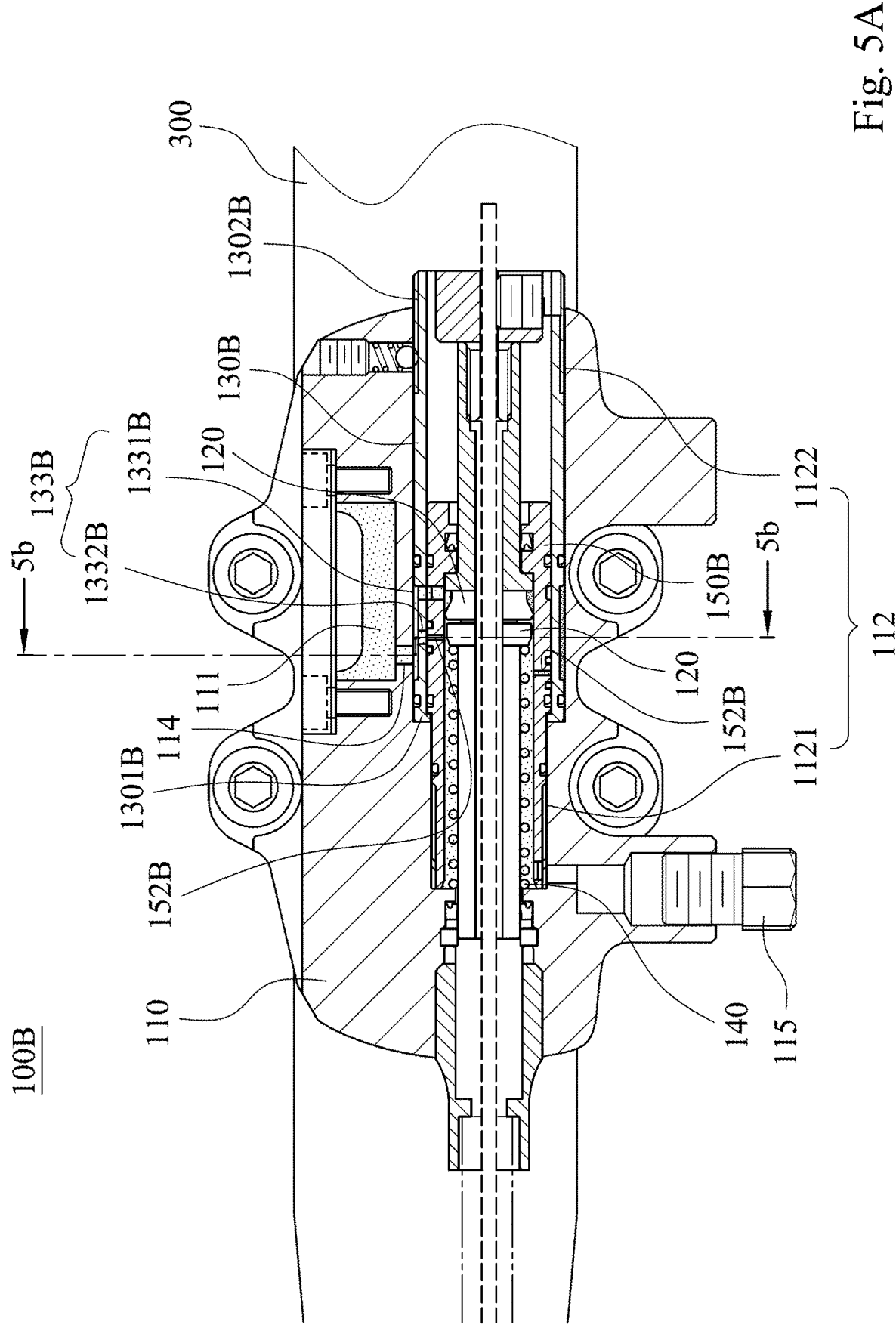
FIG. 5A shows a cross-sectional view of an adjustment structure of a hydraulic brake system according to a third embodiment of the present disclosure.
Figure 5B:
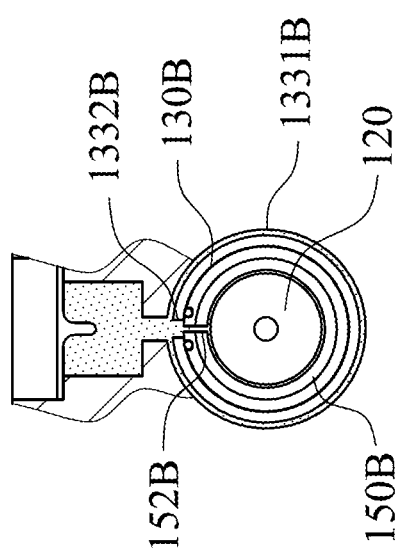
FIG. 5B shows a partial cross-sectional view of the adjustment structure of the hydraulic brake system of FIG. 5A taken along line 5b-5b.
Figure 6A:
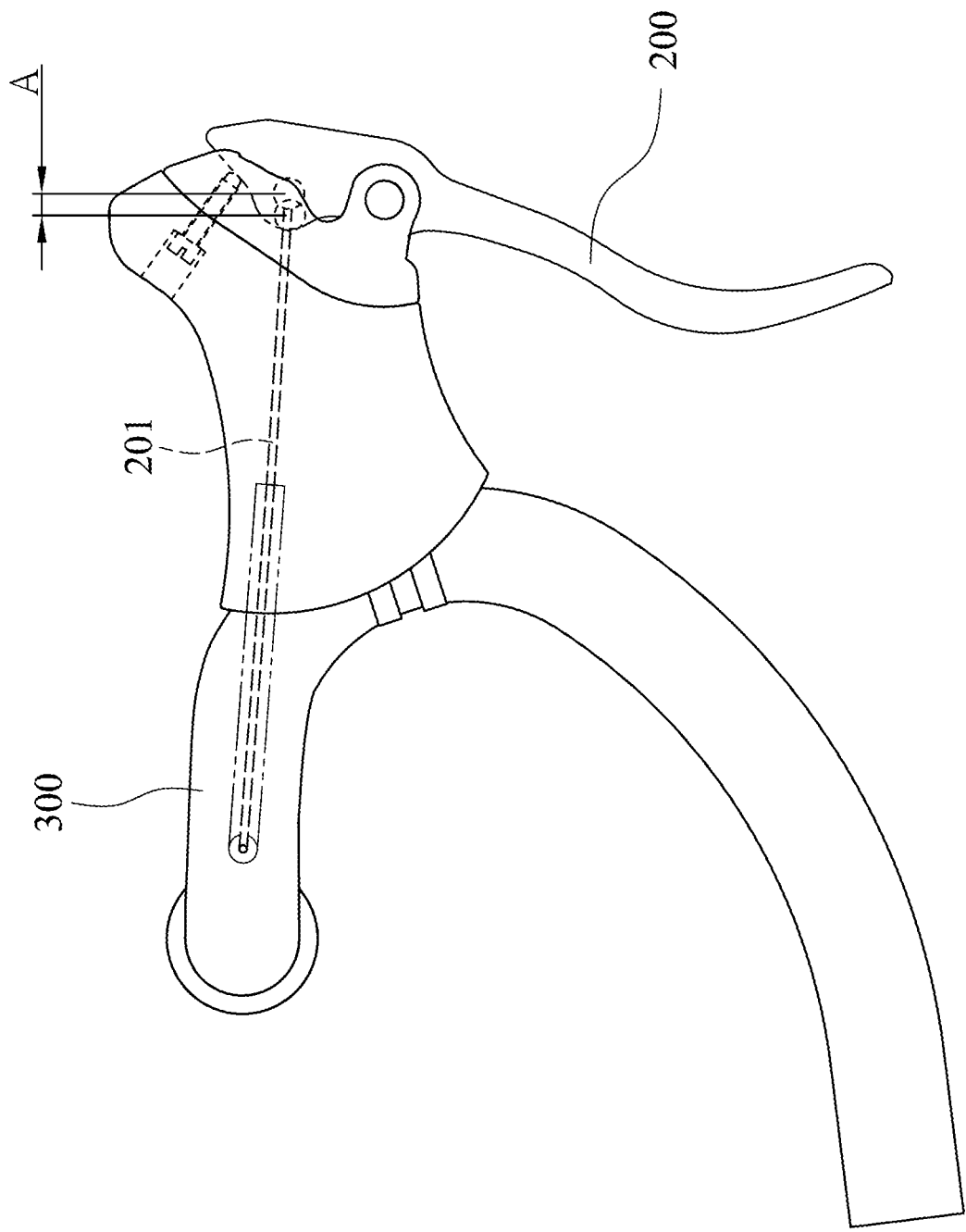
FIG. 6A shows one side view of the adjustment structure of the hydraulic brake system of FIG. 5A after a length of the brake cable is changed by adjusting the brake lever.
Figures 1, 6B:
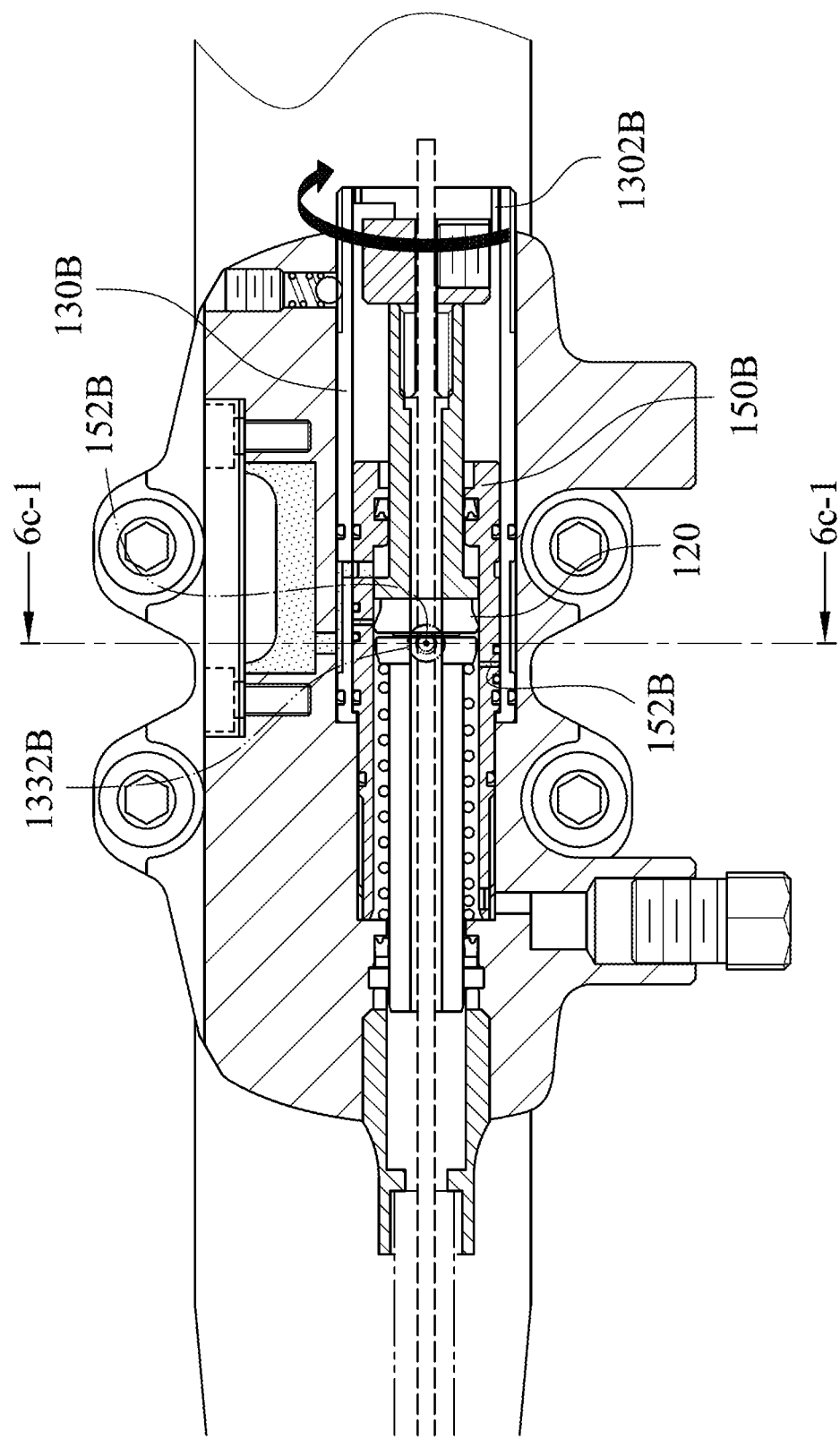
Figures 2, 6B:
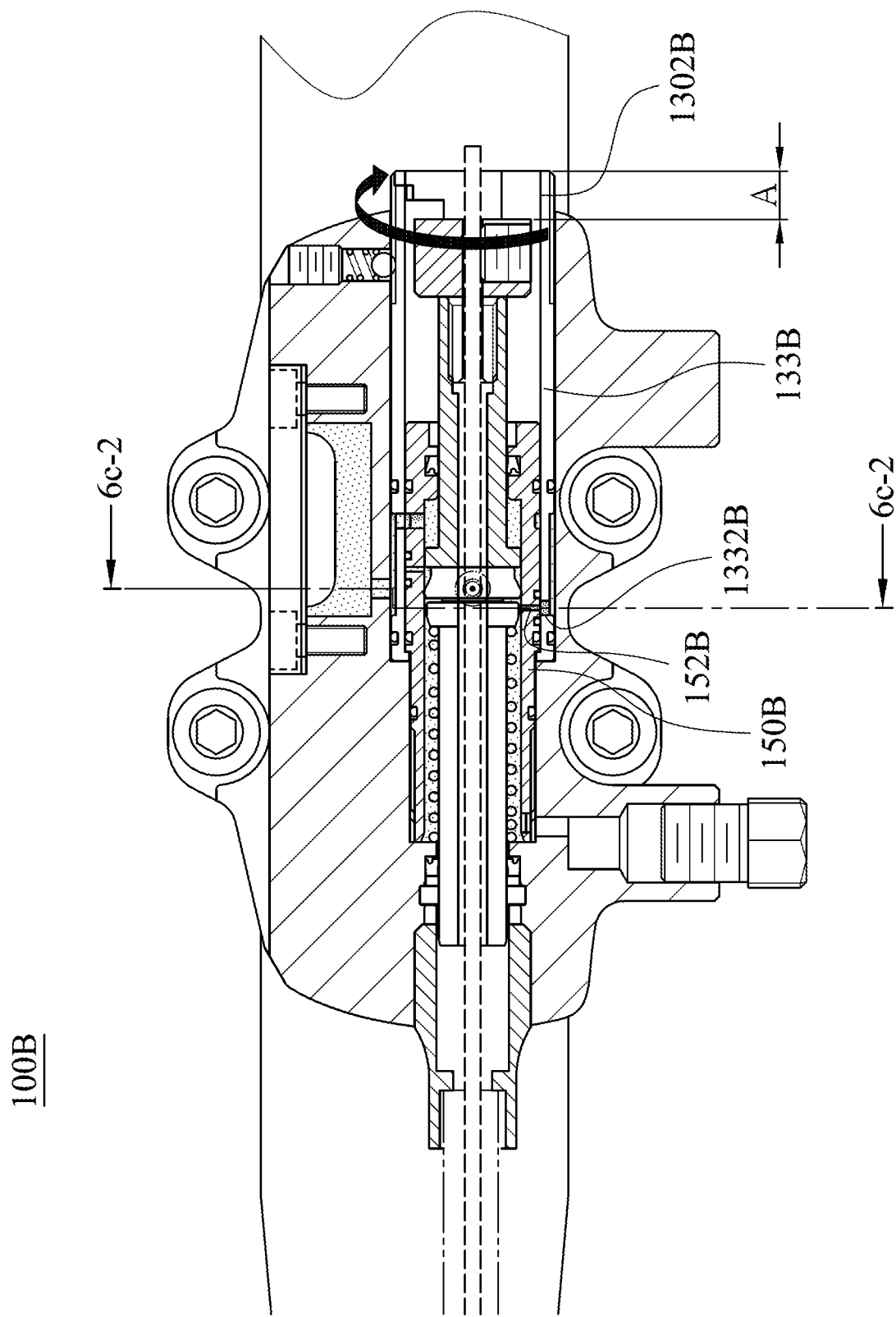
Figures 1, 6C:
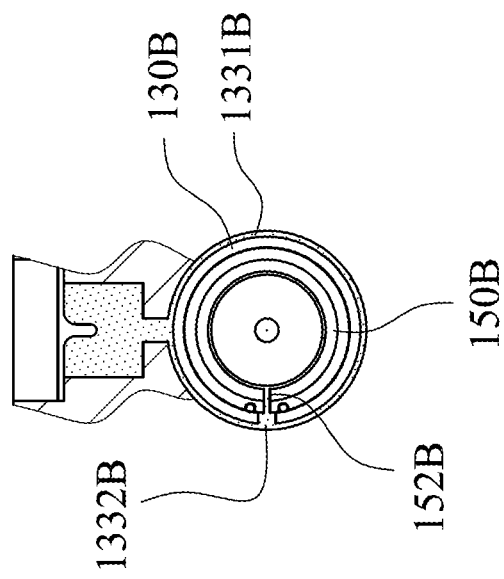
Figures 2, 6C:
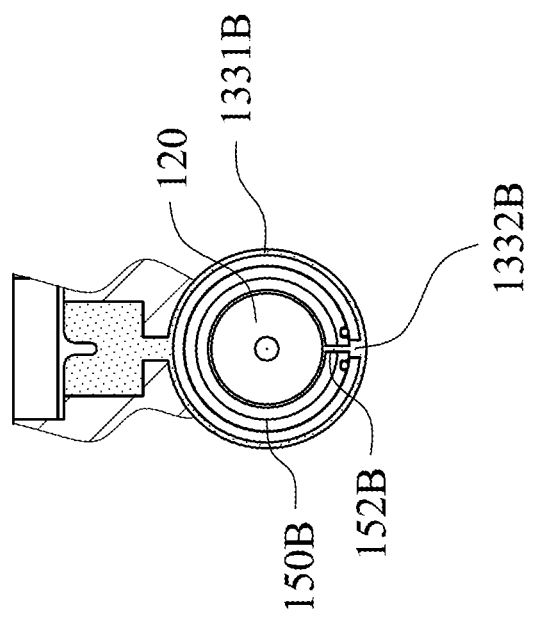

Please refer to FIGS. 5A, 5B, 6A, 6B-1, 6B-2, 6C-1 and 6C-2. FIG. 5A shows a cross-sectional view of an adjustment structure 100B of a hydraulic brake system according to a third embodiment of the present disclosure. FIG. 5B shows a partial cross-sectional view of the adjustment structure 100B of the hydraulic brake system of FIG. 5A taken along line 5b-5b. FIG. 6A shows one side view of the adjustment structure 100B of the hydraulic brake system of FIG. 5A after a length of the brake cable 201 is changed by adjusting the brake lever 200. FIG. 6B-1 shows one cross-sectional view of the adjustment structure 100B of the hydraulic brake system of FIG. 5A after an adjusting device 130B being operated. FIG. 6B-2 shows another cross-sectional view of the adjustment structure 100B of the hydraulic brake system of FIG. 5A after the adjusting device 130B being operated. FIG. 6C-1 shows a partial cross-sectional view of the adjustment structure 100B of the hydraulic brake system of FIG. 6B-1 taken along line 6c-1-6c-1. FIG. 6C-2 shows a partial cross-sectional view of the adjustment structure 100B of the hydraulic brake system of FIG. 6B-2 taken along line 6c-2-6c-2.

As shown in FIGS. 5A, 5B, 6A, 6B-1, 6B-2, 6C-1 and 6C-2, the adjustment structure 100B of the hydraulic brake system is coordinated with a brake cable 201 controlled by a brake lever 200. The adjustment structure 100B of the hydraulic brake system is detachably assembled on a handlebar 300. The adjustment structure 100B of the hydraulic brake system includes a main body 110, a piston 120, an adjusting device 130B, a returning spring 140 and a sleeve tube 150B.

The main body 110 includes a fluid reservoir 111, an inner chamber 112 and at least one fluid passage (not labeled). The inner chamber 112 includes a cylinder channel 1121 and an opening part 1122 communicated with the cylinder channel 1121, and the fluid passage is filled with a hydraulic fluid. The cylinder channel 1121 is communicated with the fluid reservoir 111 by a fluid port 114 of the fluid passage, and the hydraulic fluid can flow out of the cylinder channel 1121 via a hydraulic hose 115.

The adjusting device 130B includes a tube body. The adjusting device 130B is disposed in the inner chamber 112, and a first end 1301B of the adjusting device 130B is rotatably located in the cylinder channel 1121. The adjusting device 130B includes an annular fluid guiding passage 133B located at the first end 1301B of the adjusting device 130B and is corresponding to the fluid port 114. A second end 1302B of the adjusting device 130B is exposed from the opening part 1122 for manually operating. The annular fluid guiding passage 133B of the adjusting device 130B includes an annular groove 1331B and a plurality of guiding ports 1332B arranged along a spiral path. The annular groove 1331B rotatably surrounds an outside of the adjusting device 130B and is communicated with the fluid port 114. Different guiding ports 1332B are communicated with the annular groove 1331B and different supplying ports 152B which will be described in the following paragraphs.

The returning spring 140 is abutted between the inner chamber 112 and the piston 120.

The sleeve tube 150B is positioned in the main body 110, and is disposed in the first end 1301B of the adjusting device 130B. The adjusting device 130B is disposed at an outside of the sleeve tube 150B and can be rotated liquid-tightly. The sleeve tube 150B includes a plurality of supplying ports 152B arranged along a spiral path, and the fluid reservoir 111 is communicated with at least one of the supplying ports 152B through the fluid port 114 and the annular fluid guiding passage 133B. Each of the guiding ports 1332B of the adjusting device 130B is communicated with one of the supplying ports 152B when the adjusting device 130B is rotated to align with one of the supplying ports 152B at a corresponding rotating degree of the adjusting device 130B.

The piston 120 includes a seal (not labeled). The piston 120 is located within the sleeve tube 150B which is located in the cylinder channel 1121. The piston 120 includes a cable hole 1201 for receiving the brake cable 201. The piston 120 has a plurality of operated positions relative to the plurality of supplying ports 152B. When the piston 120 is located at any one of the normal operated positions, the hydraulic brake system can be operated normally, and the piston 120 will not exceed or block all the supplying ports 152B.

The piston 120 shown in each of FIGS. 5A and 5B is located in the normal operated position, and the hydraulic brake system can work normally. The piston 120 is located at the normal operated position relative to the outermost supplying port 152B while the outermost guiding port 1332B is communicated with the fluid reservoir 111 through the outermost supplying port 152B, the annular fluid guiding passage 133B and the fluid port 114.

When the brake cable 201 controlled by the brake lever 200 is adjusted with the maximum adjustable distance A by the user, the piston 120 linked up with the brake cable 201 will leave the original operated position to move toward the brake lever 200, as shown in FIGS. 6B-1 and 6B-2. The piston 120 may exceed the original operated position relative to the outermost supplying port 152B; meanwhile, the piston 120 may be moved to the normal operated position relative to the middle or the innermost supplying port 152B. Hence, the user can rotate the second end 1302B of the adjusting device 130B to adjust the guiding ports 1332B to be rotated to different rotating degrees, e.g., 90 degrees in FIG. 6C-1 or 180 degrees in FIG. 6C-2. One of the guiding ports 1332B is communicated with the annular groove 1331B and the appropriate supplying port 152B, e.g., the middle or the innermost supplying port 152B, such that the piston 120 can be operated normally. A visible mark (not labeled) can be located at an outer surface of the second end 1302B of the adjusting device 130B, which is exposed from the opening part 1122. The visible mark shows an adjusting length or a rotatable angle of the adjusting device 130B.

Figure 8A:
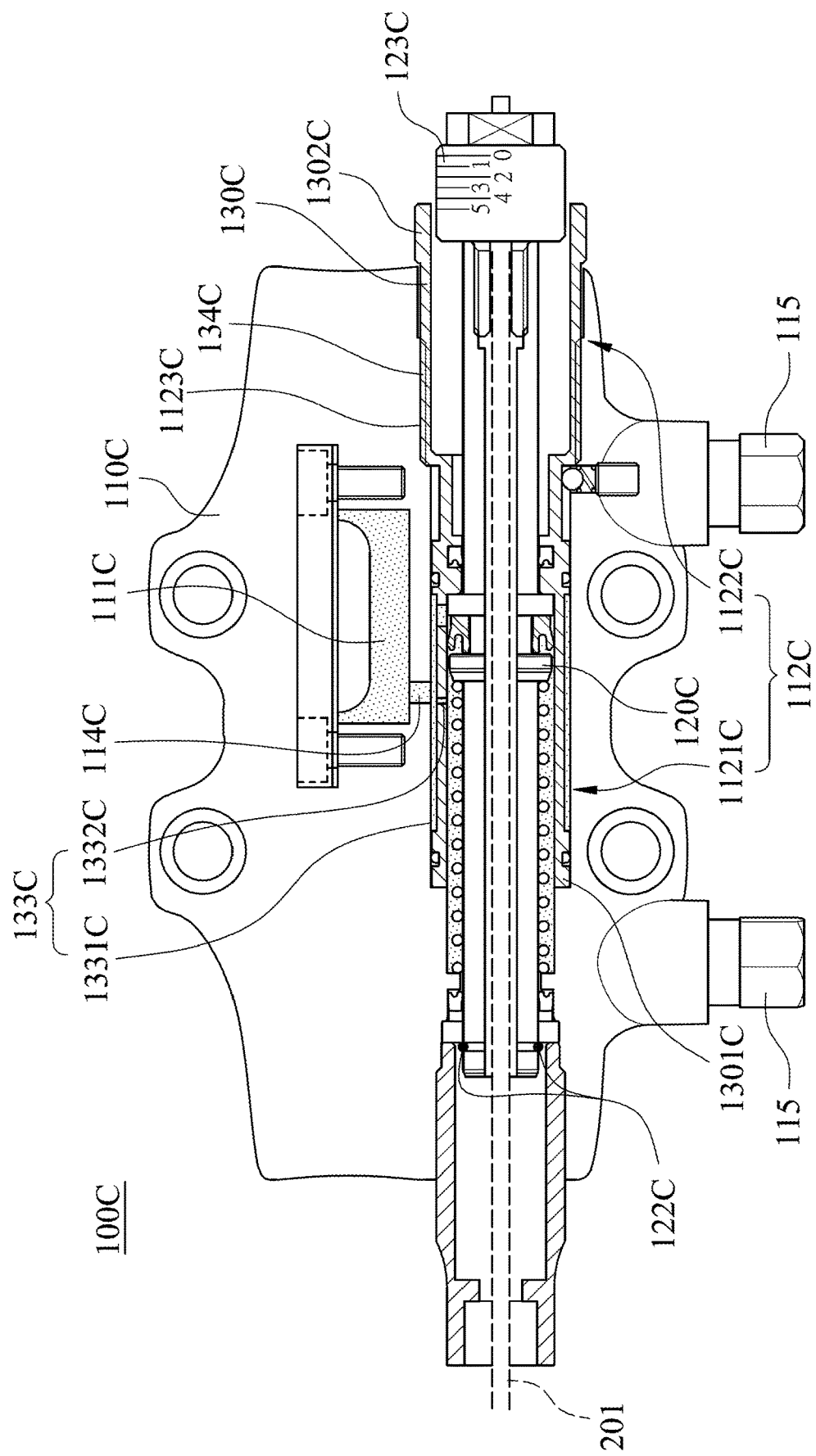
FIG. 8A shows one cross-sectional view of the adjustment structure of the hydraulic brake system of FIG. 7 before an adjusting device being operated.
Figure 8B:
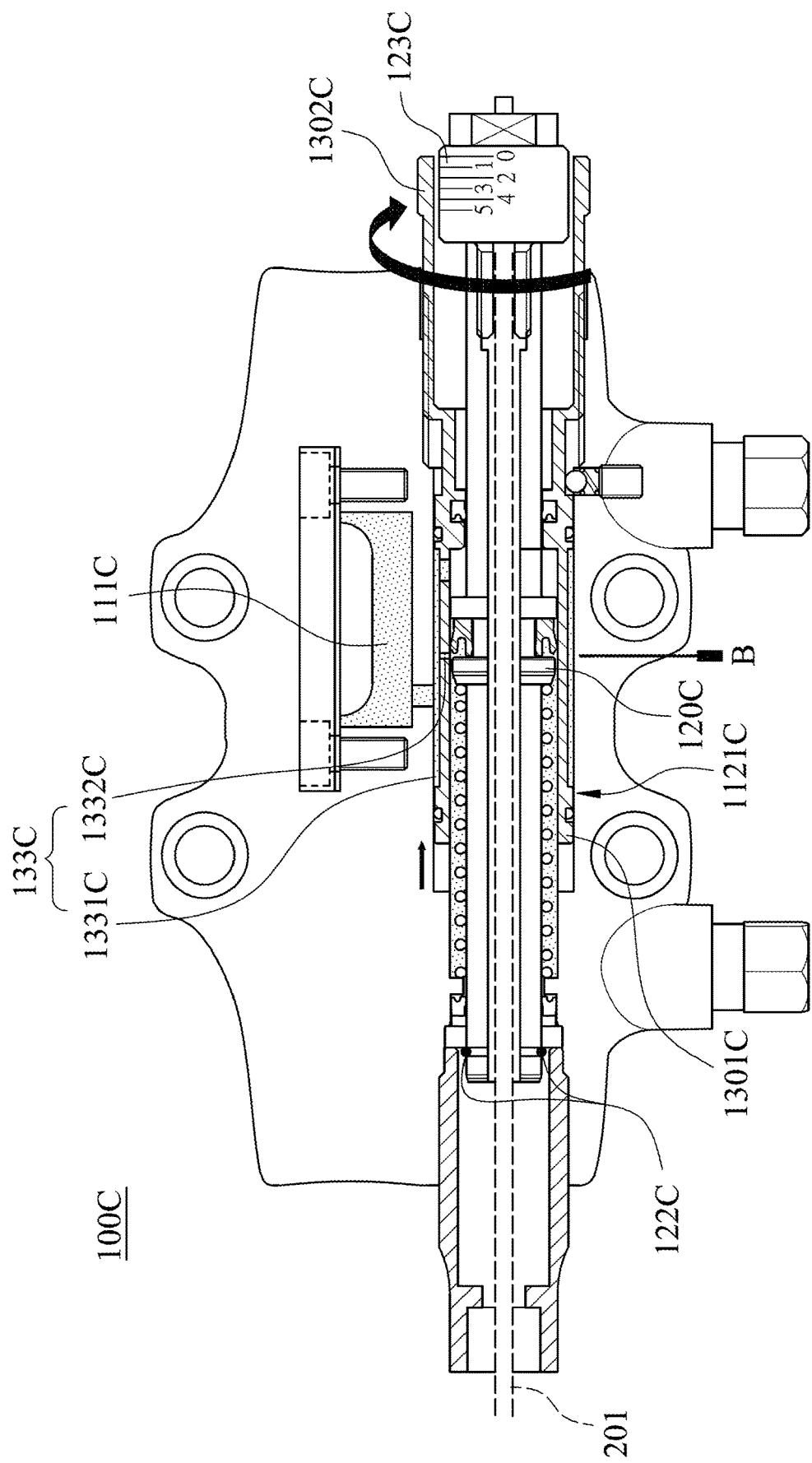
FIG. 8B shows another cross-sectional view of the adjustment structure of the hydraulic brake system of FIG. 7 after the adjusting device being operated.

Please refer to FIGS. 7, 8A and 8B. FIG. 7 shows a cross-sectional view of an adjustment structure 100C of a hydraulic brake system according to a fourth embodiment of the present disclosure. FIG. 8A shows one cross-sectional view of the adjustment structure 100C of the hydraulic brake system of FIG. 7 before an adjusting device 130C being operated. FIG. 8B shows another cross-sectional view of the adjustment structure 100C of the hydraulic brake system of FIG. 7 after the adjusting device 130C being operated. For clarification, only one inner chamber 112 is shown in FIGS. 8A and 8B.

As shown in FIGS. 7, 8A and 8B, the adjustment structure 100C of the hydraulic brake system is coordinated with a brake cable 201 controlled by a brake lever. The adjustment structure 100C of the hydraulic brake system is detachably assembled on a handlebar. The adjustment structure 100C of the hydraulic brake system includes a main body 110C, a piston 120C, an adjusting device 130C and a returning spring 140C.

The main body 110C includes a fluid reservoir 111C, an inner chamber 112C and at least one fluid passage (not labeled). The inner chamber 112C includes a cylinder channel 1121C and an opening part 1122C communicated with the cylinder channel 1121C, and the fluid passage is filled with a hydraulic fluid. The cylinder channel 1121C is communicated with the fluid reservoir 111C through a fluid port 114C of the fluid passage, and the hydraulic fluid can flow out of the cylinder channel 1121C via a hydraulic hose 115. The main body 110C includes an inner thread 1123C disposed at an inner wall of the opening part 1122C.

The adjusting device 130C includes a tube body and an outer thread 134C located at an outer wall of tube body. The outer thread 134C of the adjusting device 130C is coupled to the inner thread 1123C located within opening part 1122C of the main body 110C. A second end 1302C of the adjusting device 130C is exposed from the opening part 1122C for manually operating, and a first end 1301C is rotated to move reciprocatedly within the cylinder channel 1121C. The adjusting device 130C includes an annular fluid guiding passage 133C. The annular fluid guiding passage 133C includes an annular groove 1331C and a guiding port 1332C communicated with the annular groove 1331C. The annular groove 1331C rotatably surrounds an outside of the adjusting device 130C and is communicated with the fluid port 114C. The cylinder channel 1121C is communicated with the fluid reservoir 111C through the guiding port 1332C.

The piston 120C is linked up with the brake cable 201 and disposed within the adjusting device 130C liquid-tightly. The piston 120C includes a positioning ring 122C disposed at one end of the piston 120C to allow the piston 120C to be remained at the normal operated position in the cylinder channel 1121C. The piston 120C includes a cable hole 1201 for receiving the brake cable 201. The piston 120C linked up with the brake cable 201 can be moved within the adjusting device 130C. The guiding port 1332C is moved by operating the adjusting device 130C to change the relative position between the piston 120C and the guiding port 1332C such that the piston 120C can be located at the normal operated position B again. The piston 120C includes a visible mark 123C located at an outer surface of a cable securing element (not labeled) of the adjusting device 130C, which is exposed from the opening part 1122C. The visible mark 123C shows an adjusting length of the adjusting device 130C relative to the second end 1302C of the adjusting device 130C. Precisely, the visible mark 123C can include a plurality of indications showing different adjusting lengths of the adjusting device 130C.

The returning spring 140C is abutted between the inner chamber 112C and the piston 120C, and the returning spring 140C pushes the piston 120C to be abutted against the cable securing element of the adjusting device 130C.

Furthermore, the adjustment structure 100C of the hydraulic brake system can further include a positioning device 400. The positioning device 400 is disposed at the main body 110C, and the positioning device 400 includes an abutted ball 401 abutted against the adjusting device 130C. The adjusting device 130C includes a plurality of positioning grooves 135C coordinated with the abutted ball 401. When rotating the adjusting device 130C, the abutted ball 401 will be located at different positioning grooves 135C according to the movement of the adjusting device 130C to achieve the effect of segmental positioning.

Therefore, when the piston 120C is not located at the normal operated position B, and the piston 120C and the guiding port 1332C are too far away from each other, as shown in FIG. 8A, the hydraulic brake system cannot work properly. After operating the adjusting device 130C, as shown in FIG. 8B, the piston 120C is relocated at the normal operated position B through the movement and the fluid communicating relationship of the guiding port 1332C. Hence, through the adjusting length of the adjusting device 130C of the adjustment structure 100C of the hydraulic brake system, the piston 120C can be relocated at the normal operated position B, and the piston 120C will not exceed or block the guiding port 1332C.

Please be noted that the main body of each of the embodiments of the present disclosure can have two inner chambers (as shown in FIG. 7) and two fluid passages which represent the fluid ports, the guiding ports, the supplying ports, the annular fluid guiding passage or the communicating route therebetween which allows the hydraulic fluid to pass therethrough. Thus, when at least one fluid reservoir is disposed on the handlebar of each embodiment of the present disclosure, the hydraulic fluid can be provided to the two inner chambers. The abovementioned mechanism is only one of the embodiments which can be carried out, and the present disclosure is not limited thereto. In addition, the normal operated position mentioned in the present disclosure does not represent a specific position, and the normal operated position is a position of the piston relative to the fluid port, the guiding port or the supplying port.

The abovementioned brake lever can be a main brake lever or a sub-brake lever with small size.

Moreover, when the adjusting device is rotatable and has one end exposed from the opening part, or a visible mark (not labeled) can be located at the outer surface of the adjusting device or the element exposed from the opening part, e.g., the cable securing element, the user can know the rotating angle or the adjusting length of the adjusting device through visible identification. The abovementioned mechanism is only one of the embodiments which can be carried out, and the present disclosure is not limited thereto.

Based on the abovementioned embodiment, the present disclosure has the following advantages: 1. The adjusting device can be manually operated to move the piston, the supplying ports or the guiding port to adjust the piston to be located at the normal operated position; 2. When the adjusting device is disposed at the opening part, and the piston includes a cable hole for receiving the brake cable, the volume can be effectively compacted and the structure can be simplified to solve the assembly difficulty, and the demands of small sized bike components can be satisfied; 3. The positioning device can assist the adjusting device to be accurately adjusted; and 4. The visible mark located at the outer surface of the adjusting device or the element exposed from the opening part, e.g., the cable securing element, can illustrate the rotating angle or the movement of the adjusting device.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An adjustment structure of a hydraulic brake system, which is coordinated with a brake cable controlled by a brake lever, the adjustment structure comprising:
   a main body, comprising a fluid reservoir, an inner chamber and at least one fluid port, wherein the inner chamber comprises a cylinder channel and an opening part communicated with the cylinder channel;
   an adjusting device screwed in the opening part of the main body, wherein the adjusting device is rotated so as to move reciprocatedly in the cylinder channel, and the adjusting device comprises an annular fluid guiding passage and a positioning groove, wherein the annular fluid guiding passage comprises:
   a guiding port; and
   an annular groove connected to the guiding port, wherein the annular groove surrounds an outside of the adjusting device and is communicated with the cylinder channel and the fluid reservoir via the at least one fluid port; and
   a piston connected to the brake cable and liquid-tightly disposed in the adjusting device, wherein the piston is limitedly moved in the cylinder channel and comprises a cable hole for receiving the brake cable, and the adjusting device is rotated to adjust the piston to be located at a normal operated position relative to the guiding port;
   a positioning device disposed at the main body, the positioning device comprising an abutted ball coordinated with and movable in the positioning groove;
   wherein when the adjusting device is located at a first position, the abutted ball is adjacent to one of two end walls of the positioning groove, and when the adjusting device is rotated to move to a second position along an axial direction of the cylinder channel, the positioning groove is moved along the axial direction of the cylinder channel relative to the abutted ball to allow the abutted ball to be adjacent to the other one of the two end walls of the positioning groove.

2. The adjustment structure of the hydraulic brake system of claim 1, wherein the piston comprises:
   a visible mark located at an outer surface of a cable securing element of the adjusting device, which is exposed from the opening part;
   wherein the visible mark comprises a plurality of indications showing different adjusting lengths of the adjusting device.

3. The adjustment structure of the hydraulic brake system of claim 1, wherein the adjustment structure of the hydraulic brake system is detachably assembled on a handlebar, a number of the inner chamber is two, and each of the inner chambers is communicated with the fluid reservoir.

4. The adjustment structure of the hydraulic brake system of claim 1, further comprising:
   a returning spring abutted between the main body and the piston.

5. The adjustment structure of the hydraulic brake system of claim 4, wherein the piston comprises:
   a positioning ring disposed in the cylinder channel, wherein the positioning ring is coordinated with the returning spring to allow the piston to be remained at the normal operated position which is linked up with the brake cable.

* * * * *